United States Patent [19]

Kohama et al.

[11] 4,357,830

[45] Nov. 9, 1982

[54] GAS FLOW MEASURING APPARATUS

[75] Inventors: Tokio Kohama, Nishio; Hisasi Kawai, Toyohashi; Hideki Obayashi, Okazaki; Tsuneyuki Egami, Aichi, all of Japan

[73] Assignee: Nippon Soken, Inc., Nishio, Japan

[21] Appl. No.: 188,021

[22] Filed: Sep. 17, 1980

[30] Foreign Application Priority Data

Sep. 21, 1979 [JP] Japan .................. 54-122363
Mar. 21, 1980 [JP] Japan .................. 55-36615

[51] Int. Cl.³ .................................. G01F 1/68
[52] U.S. Cl. .............................. 73/204; 73/118
[58] Field of Search ........................ 73/204, 118

[56] References Cited

U.S. PATENT DOCUMENTS

| | | | |
|---|---|---|---|
| 1,902,427 | 3/1933 | Sawyer ................... | 73/204 |
| 3,246,515 | 4/1966 | Martino et al. ........ | 73/204 |
| 3,648,518 | 3/1972 | Hans et al. ............. | 73/204 |
| 3,975,951 | 8/1976 | Kohama et al. ........ | 73/204 |
| 4,244,217 | 1/1981 | Ledbetter ............... | 73/204 |

FOREIGN PATENT DOCUMENTS 1086742 10/1967 United Kingdom ................ 73/204

*Primary Examiner*—Herbert Goldstein
*Attorney, Agent, or Firm*—Cushman, Darby & Cushman

[57] ABSTRACT

A gas flow measuring apparatus of the type which measures for example, the amount of air flow to the engine of an automotive vehicle, includes a flow measuring tube, an electric heater wire and two temperature dependent resistance wires which are all positioned in the flow measuring tube such that one of the temperature dependent resistance wires is subjected to the effect of the heat of the electric heater and the other is not subjected to the same effect, whereby the flow rate of gas is measured in accordance with the output signal of a voltage divider including a series-connection of the temperature dependent resistance wires. The electric heater wire and the temperature dependent resistance wire subjected to the effect of the heat from the former are wound closely and alternately on the same support made from an electrical insulating material.

7 Claims, 13 Drawing Figures

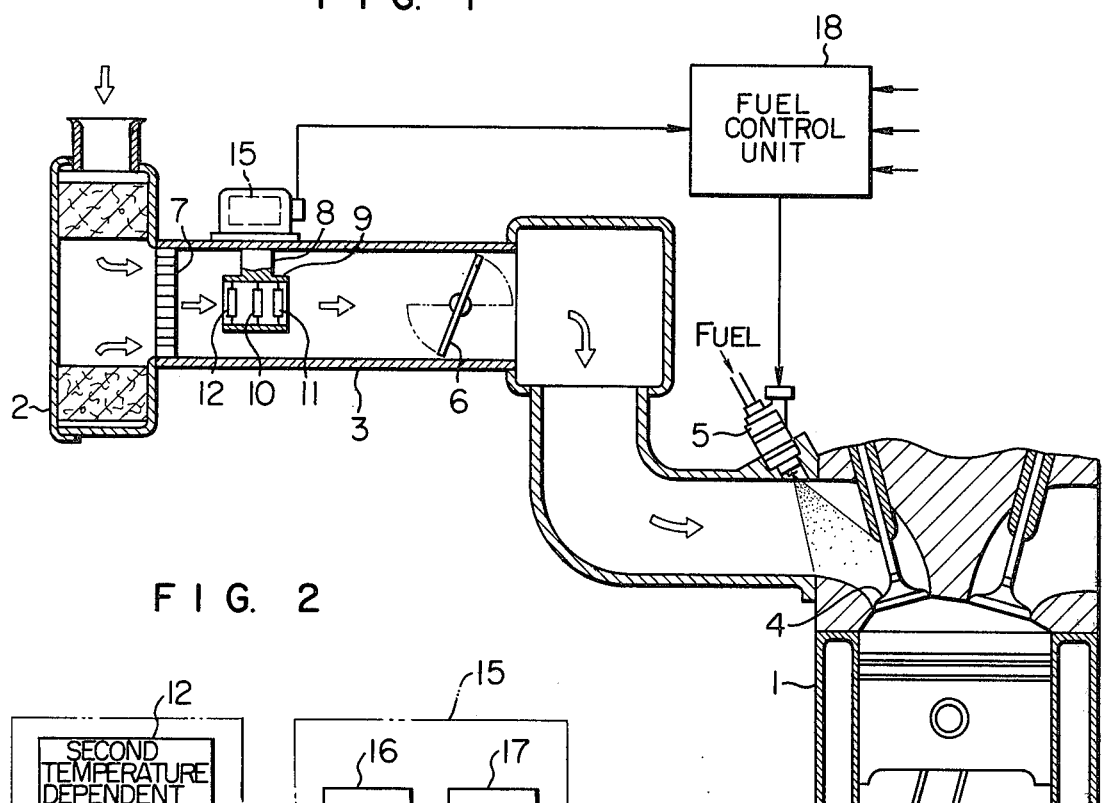
FIG. 1
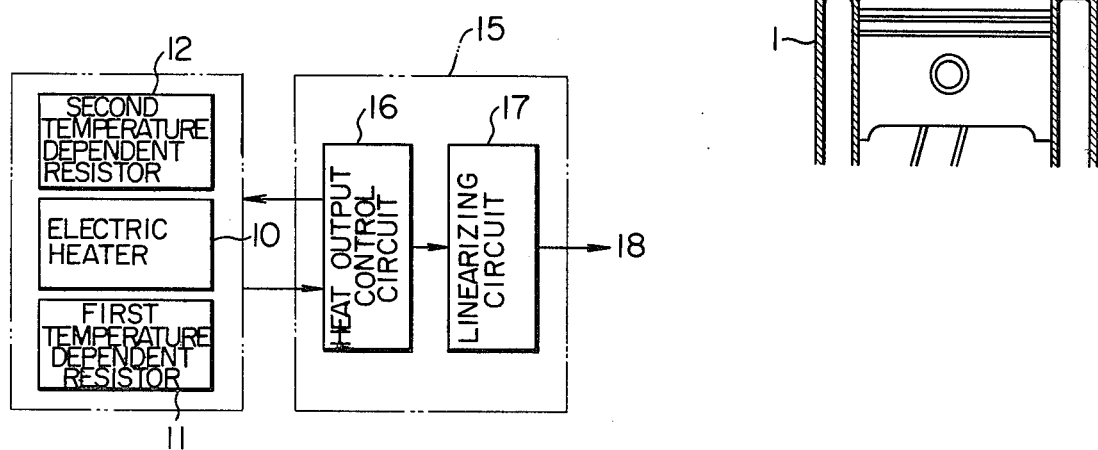
FIG. 2
FIG. 3B
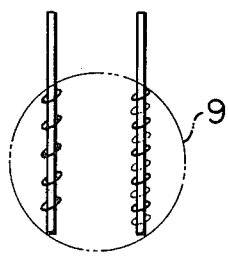
FIG. 3A
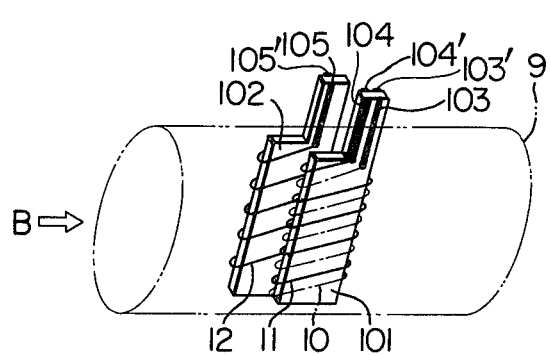

GAS FLOW MEASURING APPARATUS

RELATED REFERENCES

U.S. Ser. No. 92,024 filed Nov. 7, 1979, now U.S. Pat. No. 4,332,165, and assigned to the same assigned is a copending application of this application.

BACKGROUND OF THE INVENTION

The present invention relates to gas flow measuring apparatus and more particularly to an apparatus for measuring, for example, the amount of air flow to an engine.

In the past, there has been proposed an apparatus in which a flow measuring tube is disposed in the intake pipe of an automobile engine, and an electric heater and temperature dependent resistors, which each consist of a platinum resistance wire, are disposed in the flow measuring tube, whereby the flow rate of air (the gas to be measured) is measured in accordance with the output signals of the heater and the resistor.

While this apparatus has the advantage of ensuring accurate flow measurement with a compact and simple construction, there is a disadvantage in that since a very fine platinum resistance wire is used for the temperature dependent resistors and the resistors are used by suspending them in the air stream, there is a problem from the strength point of view when the platinum resistance wires are subjected to a shock due to a backfire (if the ignition timing or the valve timing of the intake and exhaust valves are adjusted improperly in the engine combustion mechanism, a phenomenon, in which the fuel and air are burned explosively in the intake pipe by the flame in the combustion chamber, occurs and this phenomenon is called "backfire").

Further, in the measuring principle the control is initiated only when the heat of the electric heater is applied to the temperature dependent resistor, and consequently from the control point of view it is essential that the heat of the electric heater is rapidly transmitted to the temperature dependent resistor. However, the known apparatus is disadvantageous in that since the electric heater, the first temperature dependent resistor and the second temperature resistor are each mounted on a separate support, there is a limit from the distance point of view for arranging the electric heater and the first temperature dependent resistor, which receives the heat from the former, in close proximity to each other.

Another disadvantage is that since the electric heater and the first temperature dependent resistor adapted to receive the heat from the former are each disposed on a separate support, the heat of the electric heater is not entirely applied to the first temperature dependent resistor and part of the heat is taken by the support, thus causing a flow measurement error corresponding to the heat loss and thereby deteriorating the measurement accuracy.

SUMMARY OF THE INVENTION

With a view to overcoming the foregoing deficiencies, it is an object of the present invention to provide an improved flow measuring apparatus in which temperature dependent resistors are each wound on a support made from an electric insulating material, thereby increasing their strength and preventing damage to the temperature dependent resistors and improving their durability.

It is another object of the invention to provide such flow measuring apparatus in which an electric heater resistance wire and a first temperature dependent resistance wire are both wound alternately and closely on the same support made from an electric insulating material, thus arranging the electric heater and the first temperature dependent resistor in a closer proximity to each other and thereby improving the controllability further.

It is still another object of the invention to provide such flow measuring apparatus in which an electric heater and a first temperature dependent resistor are disposed on the same support, decreasing the heat loss of the electric heater and thereby improving the accuracy of measurement.

It is still another object of the invention to provide such flow measuring apparatus in which an electric heater resistance wire and a first temperature dependent resistance wire are wound alternately and very closely on a first support so as to prevent any short circuiting therebetween. Each of the first support and a second support having a second temperature dependent resistance wire wound thereon is formed with projections (e.g., formed into a cross shape in section), whereby the electric heater resistance wire and the first temperature dependent resistance wire are arranged close to each other to ensure the transmission of heat therebetween with reduced loss, and the electric heater resistance wire and the first and second temperature dependent resistance wires are each only partly contacted with the support so as to reduce the effect of the heat capacity of the supports and thereby to improve the accuracy and response of the flow measurement.

It is still another object of the invention to provide such flow measuring apparatus in which an electric heater resistance wire and first and second temperature dependent resistance wires are simply wound suitably on first and second supports each made from an electric insulating material, thus simplifying its manufacture.

BRIEF DESCRIPTION OF THE DRAWINGS

FIG. 1 is a schematic diagram showing the overall construction of a system incorporating a gas flow measuring apparatus according to the present invention.

FIG. 2 is a block diagram of the measuring circuit shown in FIG. 1.

FIG. 3A is a perspective view showing an embodiment of the supports used in the apparatus of the invention.

FIG. 3B is a cross-sectional view of FIG. 3A.

DESCRIPTION OF THE PREFERRED EMBODIMENTS

Figure 4:
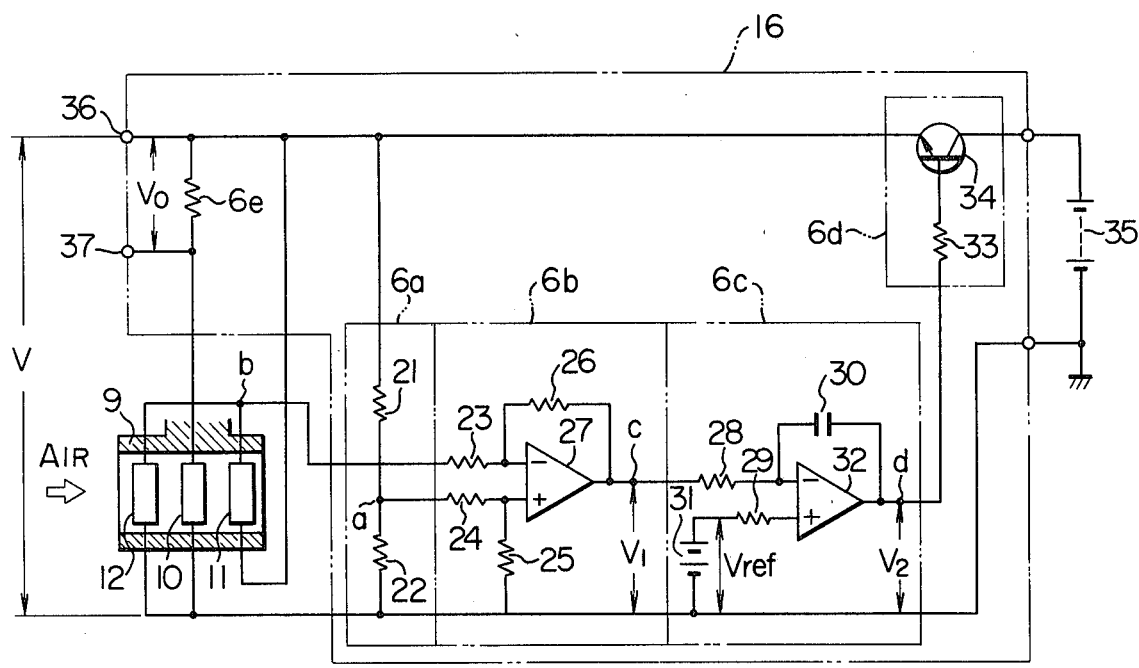
FIG. 4 is a circuit diagram of the heat output control circuit shown in FIG. 2.

The present invention will now be described in greater detail with reference to the illustrated embodiments.

Referring to FIG. 1, an engine 1 is a spark ignition engine for automobiles and the combustion air is sucked by way of an air cleaner 2, an intake pipe 3 and an intake valve 4. The fuel is supplied through an electromagnetic fuel injection valve 5 mounted in the intake pipe.

Disposed in the intake pipe 3 is a throttle valve 6 which is operated by the driver as desired, and a honeycomb member 7 for making the air flow uniform or straightening the air flow is disposed at the junction between the air cleaner 2 and the intake pipe 3.

Also disposed in the intake pipe 3 between the honeycomb member 7 and the throttle valve 6 is a small flow measuring tube 9 which is suspended from a supporting member 8 to extend substantially parallel to the axial direction of the intake pipe 3. Disposed in the flow measuring tube 9 and shown schematically are a platinum resistance wire 10 forming an electric heater, a platinum resistance wire 11 positioned close to the electric heater 10 and forming a first temperature dependent resistor and a platinum resistance wire 12 placed in a slightly remote position upstream of the heater resistance wire 10.

FIGS. 3A and 3B show a first specific embodiment of supports for the electric heater 10 and the first and second temperature dependent resistors 11 and 12 and they will be described with reference to the Figures. The electric heater resistance wire 10 and the first temperature dependent resistance wire 11 are alternately and closely wound on a plate support 101 made from an electrical insulating material such as ceramic or synthetic resin. The second temperature dependent resistance wire 12 is wound on a support 102 made from a similar electric insulating material, and the resistance wires 10, 11 and 12 are partly fixed to the associated supports 101 and 102 with an adhesive. While the supports 101 and 102 are arranged parallel to such air flow as shown by the arrow, it is only necessary for the support 102 that it is positioned upstream of the support 101 or it is positioned in the flow measuring tube 9 such that it is not completely or easily subjected to the thermal effect of the electric heater 10.

While the resistance wires 10, 11 and 12 are each made of platinum whose resistance value varies with temperature, the resistance wires 11 and 12 have the same resistance-temperature characteristic.

While the platinum temperature dependent resistance wires are used, it is of course possible to use temperature dependent resistors comprised of platinum alloy or tungsten resistors.

The resistance wires 10, 11 and 12 are respectively connected to a measuring circuit 15 through copper foils 103 and 103′, 104 and 104′ and 105 and 105′ which are each fixed to one of the supports 101 and 102 so that the amount of air flow to the engine is measured by the measuring circuit 15 which generates an electric signal corresponding to the flow rate.

As shown in FIG. 2, the measuring circuit 15 comprises a heat output control circuit 16 and a linearizing circuit 17. The heat output control circuit 16 is responsive to the output signals of a bridge including the resistance wires 11 and 12 to control the voltage applied to the heater resistance wire 10 and the bridge, and the linearizing circuit 17 provides compensation such that the output signal of the heat output control circuit 16 is made linear with respect to the amount of air flow.

Referring again to FIG. 1, a fuel control unit 18 is responsive to the signal from the measuring circuit 15 to control the duration of opening of the electromagnetic fuel injection valve 5, and the control unit 18 also receives the output signals of other sensors (not shown) including an engine speed sensor for detecting the rotational speed of the engine 1.

Next, the heat output control circuit 16 will be described with reference to FIG. 4. Basically, the heat output control circuit 16 comprises a reference resistor means 6a, a first differential amplifier 6b, a second differential amplifier 6c, a power amplifier 6d and an output resistor 6e.

Of these components, the reference resistor means 6a comprises resistors 21 and 22 which form, with the schematically shown resistance wires 11 and 12, the bridge.

The first differential amplifier 6b comprises input resistors 23 and 24, a ground resistor 25, a negative feedback resistor 26 and operational amplifier or OP AMP 27, and it differentially amplifies the voltages at the diagonal points a and b of the bridge to generate an output at its terminal c.

The second differential amplifier 6c comprises input resistors 28 and 29, a capacitor 30, a reference voltage source 31 and an OP AMP 32, and it differentially amplifies the output voltage at the terminal c and the fixed reference voltage $V_{ref}$ from the reference voltage source 31 to generate an output at a terminal d. The capacitor 30 is provided to prevent the apparatus from oscillating.

The power amplifier 6d comprises a resistor 33 and a power transistor 34, and the power is supplied to the power transistor 34 from a battery 35 so that the output voltage of the second differential amplifier 6c is amplied and the resulting output is applied to the bridge and the heater resistance wire 10.

The output resistor 6e is provided to apply to the linearizing circuit 17 a voltage related to the amount of air flow, and the resistor 6e is connected in series with the heater resistance wire 10. The output resistor 6e has its terminals 36 and 37 connected to the linearizing circuit 17.

Figure 5:
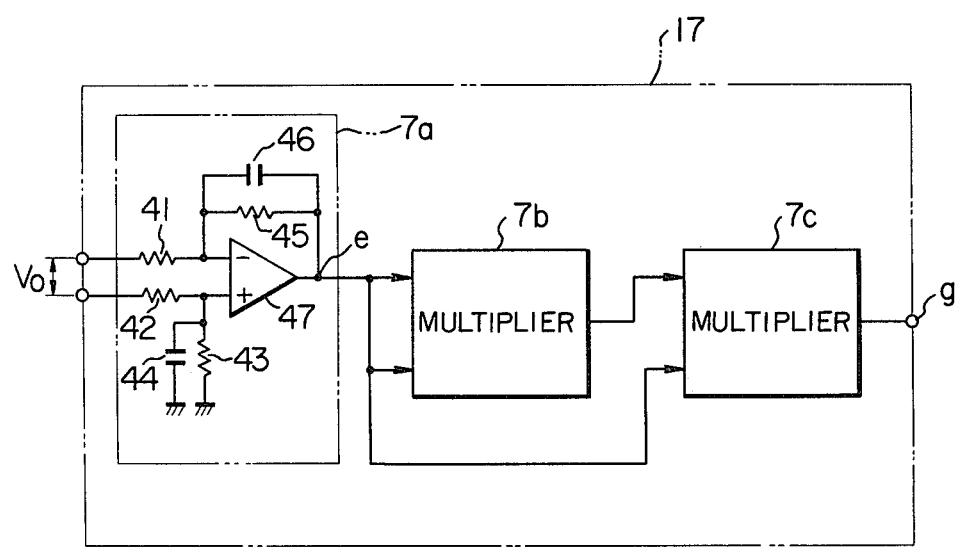
FIG. 5 is a circuit diagram of the linearizing circuit shown in FIG. 2.

Next, the linearizing circuit 17 shown in FIG. 5 will be described. Basically, the linearizing circuit 17 comprises a differential amplifier 7a and multipliers 7b and 7c.

The differential amplifier 7a comprises input resistors 41 and 42, a ground resistor 43, a ground capacitor 44, a negative feedback resistor 45, a capacitor 46 and an OP AMP 47, and it differentially amplifies the output voltage of the heat output control circuit 16 to generate an output at a terminal e.

Each of the multipliers 7b and 7c is of the known analog type in which the two input voltages are multiplied together and a voltage corresponding to the resulting product is generated.

With the construction described above, the operation of the apparatus is as following. An amount of air determined by the opening of the throttle valve 6 is supplied to the engine 1 from the air cleaner 2 through the intake pipe 3. A fixed proportion of this total air flow is sucked into the engine 1 through the flow measuring tube 9.

In the flow measuring tube 9, the resistance wire 12 positioned so as to be not influenced by the heater resistance wire 10 is subjected only to the temperature of the air drawn in, and the resistance wire 11 wound on the support 101 closely to the heater resistance wire 10 is subjected to the effect of the intake air temperature and the amount of heat generated by the heater resistance wire 10 or the temperature of the air heated by the heater resistance wire 10.

As a result, between the resistance wires 11 and 12 is produced a temperature difference $\Delta T$ which is related to the power P(W) supplied to the heater 10 and the air flow rate G (g/sec). There is a relation among the P, G and $\Delta T$ as shown by the following equation.

$$K_1 \cdot \Delta T = P/G \tag{1}$$

where $K_1$ is a constant.

In this case, since the electric resistance value of each of the resistance wires 11 and 12 varies with the air temperature, between the points a and b of the bridge is produced a potential difference $\Delta V$ which is determined by the temperature difference $\Delta T$ and the voltage V applied to the bridge as follows $$\Delta V = K_2 \cdot \Delta T \cdot V \tag{2}$$

where $K_2$ is a constant.

As a result, the following relationship is obtained from the above-mentioned equations (1) and (2).

$$K_3 \cdot \Delta V / V = P/G \tag{3}$$

where $K_3$ is a constant.

Thus, if the power P supplied to the heater resistance wire 10 and the bridge applied voltage V are controlled so as to hold the potential difference $\Delta V$ at a constant value, the relationship among the air flow rate G, the power supply P and the bridge applied voltage V is given by the following equation $$G = K_4 \cdot P \cdot V \tag{4}$$

where $K_4$ is a constant.

If the resistance value of the output resistor 6e is selected small as compared with that of the heater resistance wire 10 and the current flowing to the heater resistance wire 10 is represented by I, there follows the following equations (5) and (6)

$$P = K_5 I^2 \text{ (where } K_5 \text{ is a constant)} \tag{5}$$

$$V \approx K_6 I \text{ (where } K_6 \text{ is a constant)} \tag{6}$$

and thus the equation (4) is given by the following equations $$G \approx K I^3 \text{ (where } K \text{ is a constant)} \tag{7}$$

$$\approx K' V^3 \text{ (where } K' \text{ is a constant)} \tag{8}$$

Thus, the air flow rate G is a function of the cube of the current I (or the voltage V). In this case, though the equations (7) and (8) are approximate equations, they are such that no effect will be produced on the measurement and thus there is practically no problem in actual applications.

The heat output control circuit 16 controls the amount of heat generated by the heater resistance wire 10 so as to maintain the potential difference $\Delta V$ at a constant value. In other words, if the amount of air flow is increased, the rise in the temperature of the air heated by the heater resistance wire 10 is decreased, decreasing the temperature difference $\Delta T$ between the resistance wires 11 and 12 and also decreasing the potential difference $\Delta V$ between the bridge points a and b.

As a result, the output voltage $V_1$ of the first differential amplifier 6b decreases with the resulting increase in the output voltage $V_2$ of the second differential amplifier 6c adapted to generate a voltage corresponding to $(V_{ref} - V_1)$. When this occurs, the power amplifier 6d increases the current supplied to the heater resistance wire 10 so as to increase the amount of heat generated by the heater resistance wire 10.

Consequently, the temperature difference $\Delta T$ between the resistance wires 11 and 12 is increased so that the potential difference $\Delta V$ between the bridge points a and b is increased and the potential difference V becomes equal to the reference voltage $V_{ref}$, establishing a stable condition where the system on the whole is balanced and the bridge itself is unbalanced.

On the other hand, when the amount of air flow decreases, this increases the rise in the temperature of the air heated by the heater resistance wire 10 and the temperature difference $\Delta T$ between the resistance wires 11 and 12, thereby increasing the potential difference $\Delta V$.

As a result, the output voltage $V_1$ of the first differential amplifier 6b is increased so that the output voltage $V_2$ of the second differential amplifier 6c is decreased and the power amplifier 6d decreases the current supplied to the heater resistance wire 10, thus decreasing its heat output.

Consequently, the temperature difference $\Delta T$ is decreased and the potential difference $\Delta V$ is reduced, thus making the potential difference $\Delta V$ equal to the reference voltage $V_{ref}$ and thereby stabilizing both the system and the bridge.

In this way, the potential difference $\Delta V$ between the bridge points a and b is always maintained at the fixed value $V_{ref}$ irrespective of the amount of air flow to the engine, so that the equation (7) holds and the air flow rate G is given as a function of the cube of the current I flowing in the electric heater 10.

Since the current I also flows in the output resistor 6e, the current I is proportional to the terminal voltage $V_o$ of the output resistor 6e and the cube of this voltage $V_o$ is proportional to the air flow rate G.

Thus, the output voltage $V_o$ of the heat output control circuit 16 is cubed by the linearizing circuit 17. In other words, the terminal voltage of the output resistor 6e in the heat output control circuit 16 is amplified by the differential amplifier 7a which in turn generates a voltage given by $A_1 \cdot V_o$. Here $A_1$ is the amplification factor of the amplifier 7a.

The output voltage $A_1 \cdot V_o$ is applied to the two input terminals of the multiplier 7b which in turn generates a voltage given by $A_1^2 \cdot V_o^2$. The voltages $A_1 \cdot V_o$ and $A_1^2 \cdot V_o^2$ are applied to the multiplier 7c which in turn generates a voltage given by $A_1^3 \cdot V_o^3$.

Thus, the linearizing circuit 17 generates from its output terminal g a voltage $V_g$ which is proportional to the cube of the voltage $V_o$ or the amount of air flow.

Then, the voltage $V_g$ is applied, as a signal indicative of the air flow rate G, to the fuel control unit 18 so that in accordance with the applied signal an injection pulse signal is generated to open the fuel injection valves 5. As a result, an air-fuel mixture having the accurate air-fuel ratio A/F is supplied to the engine 1, with the resulting improvement in the exhaust emission control, power output, fuel consumption, etc., of the engine 1.

In accordance with the invention, since the electric heater 10 and the first temperature dependent resistor 11 are wound on the same support, even if the heat output of the electric heater 10 is partly taken by the support, the heat is transmitted to the first temperature dependent resistor 11 through the support, thus reducing the loss of the heat output of the electric heater 10 and greatly improving the accuracy of measurement.

Further, by virtue of the construction in which the electric heater 10 and the first temperature dependent resistor 11 are wound on the same support, it becomes possible to locate the electric heater 10 and the first temperature dependent resistor 11 very closely to each other, thus improving the response of the air flow measuring apparatus very greatly.

Structurally, the apparatus is increased in strength against the shock waves due to backfire or the like and it is also improved in reliability very greatly.

Figure 6:
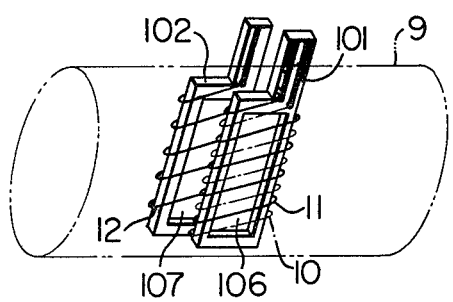
FIGS. 6 and 7 are perspective views showing respectively second and third embodiments of the supports.
Figure 7:
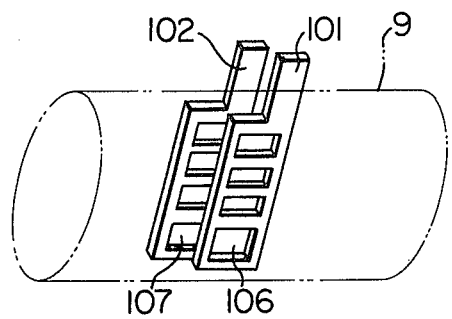

While, in the above-described first embodiment, each of the supports 101 and 102 is formed into a plate shape, they may be comprised of frame supports respectively having openings 106 and 107 as in the second embodiment shown in FIG. 6 on they may be comprised of ones respectively having each plurality of openings 106 and 107 as in the third embodiment of FIG. 7.

In this way, each of the supports can be advantageously formed with one or more openings so as to reduce the heat capacity of the supports and improve the response of the apparatus.

Figure 8A:
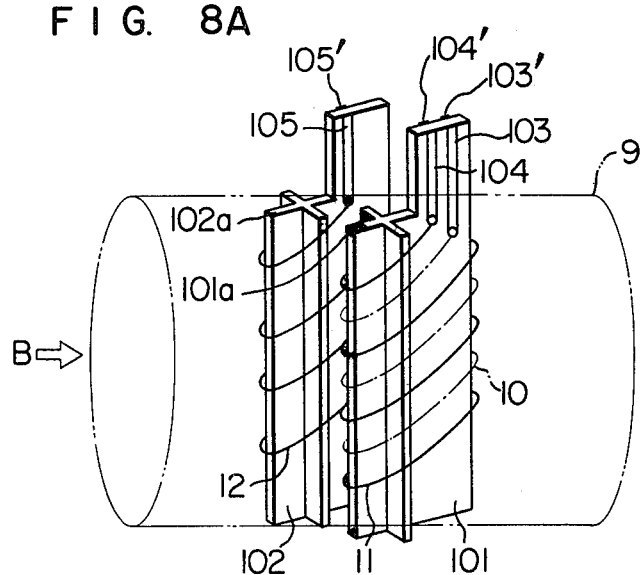
FIG. 8A is a perspective view showing a fourth embodiment of the supports.
Figure 8B:
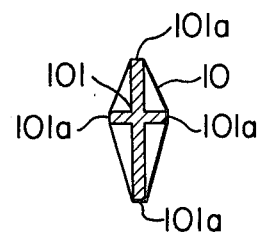
FIG. 8B is a cross-sectional view of FIG. 8A.

FIGS. 8A and 8B show in detail a fourth embodiment of the supports for the electric heater resistance wire 10 and the first and second temperature dependent resistance wires 11 and 12, and the fourth embodiment will be described with reference to the figures. The electric heater resistance wire 10 and the first temperature dependent resistance wire 11 are alternately and closely wound on a first support 101 having projections 101a, which is made from an electrical insulating material such as a ceramic or synthetic resin and formed into a cross-shaped cross section as shown in FIG. 8B. The second temperature dependent resistance wire 12 is wound on a second support 102 having projections 102a, which is made from the similar electrical insulating material, and the resistance wires 10, 11 and 12 are each fastened partly with an adhesive to the associated one of the supports 101 and 102 which are arranged parallel to the air flowing as shown by an arrow B. It is only necessary for the second support 102 that it is positioned upstream of the first support 101 or it is positioned in the flow measuring tube 9 so as to be not subjected completely or easily to the thermal effect of the electric heater resistance wire 10.

The resistance wires 10, 11 and 12 are each made from platinum whose resistance value varies with temperature, and the resistance wires 11 and 12 have the same resistance-temperature characteristic.

While each of the temperature dependent resistance wires is made from platinum, it is of course possible to use temperature dependent resistors comprised of platinum alloy or tungsten wires.

The resistance wires 10, 11 and 12 are respectively connected to the measuring circuit 15 through copper foils 103 and 103', 104 and 104', and 105 and 105' which are respectively fixed to the associated one of the supports 101 and 102, so that the measuring circuit 15 measures the amount of air flow and generates an electric signal corresponding to the measured flow rate. The resistance wires 10, 11 and 12 wound on the supports 101 and 102 are respectively connected to the straight copper foils 103', 104' and 105' on one side of the respective supports.

Figure 9:
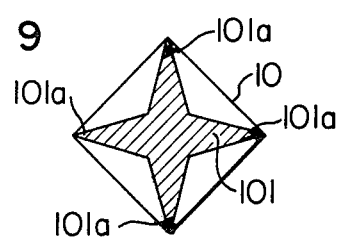
FIGS. 9 and 10 are cross-sectional views showing respectively fifth and sixth embodiments of the supports.
Figure 10:
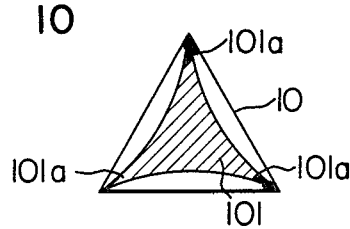

While, in the above-described fourth embodiment, the first and second supports 101 and 102 have a sectional cross-shape with the four projections 101a and 102a, respectively, they may each be formed such that each of the projections has an acute-angled end as shown in FIG. 9 or a substantially triangular cross section as shown in FIG. 10.

Figure 11:
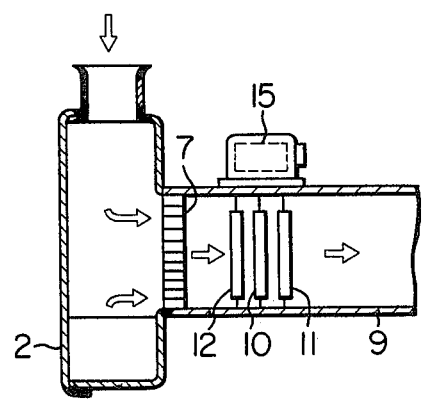
FIG. 11 is a principal sectional view showing another embodiment of the invention.

While, in the above-described embodiment of the apparatus, the flow measuring tube 9 comprises a small-diameter tube which is positioned in the intake pipe 3, the intake pipe itself may be used as the flow measuring tube 9 as shown in FIG. 11.

Further, while the above-described embodiment is shown as applied to an engine in which the flow of air is in one direction only, the invention can also be applied to engines in which there are flows in both the forward and reverse directions.

It will thus be seen from the foregoing that in accordance with the present invention there is a great advantage in that the structure including the electric heater and the first and second temperature dependent resistors can be improved in strength and the electric heater and the first temperature dependent resistor can be positioned very closely to each other, thus improving the response of the flow measurement and also reducing the heat loss with the resulting improvement in the accuracy of measurement.

Another great advantage of the invention is that each of the first and second supports is formed with projections with the result that each of the electric heater resistance wire and the first and second temperature dependent resistors is contacted only in part with its support, thus decreasing the effect of the heat capacity of the supports on the resistance wires and thereby greatly improving the accuracy of flow measurement.

Still another great advantage of the invention is that the required flow sensing section is provided by simply winding the electric heater resistance wire and the first and second temperature dependent resistance wires on the first and second supports each made from an electric insulating material, thus simplifying the manufacture of the apparatus.

While a fuel injection type engine is used in the above embodiments, a carburetor type engine may be used in which the amounts of the exhaust gas recirculation and ignition advance can be controlled by the amount of intake air flow. The present invention can be applied to other combustion mechanisms other than engines, for measuring the amount of gas flow.

Furthermore, the linearizing circuit used in the measuring circuit can be replaced by a ROM (read-only memory) or the like for digital signal processing, or omitted if the linear output is not required.

It will be apparent that many modifications and advantages may be effected without departing from the scope of the novel concepts of the invention.

We claim:

1. A gas flow measuring apparatus comprising:
a flow measuring tube disposed such that a gas to be measured flows therethrough;
a resistance wire forming an electric heater and wound on a first support made from an electrical insulating material;

a first temperature dependent resistance wire wound on said first support alternately and closely with said electric heater resistance wire so as not to establish a short-circuit therebetween;

a second temperature dependent resistance wire positioned in said flow measuring tube so as to be not easily subjected to the effect of heat generated by said electric heater, said second temperature dependent resistance wire being wound on a second support made from an electrical insulating material; and wherein each of said first and second supports is formed into a plate shape having at least one opening therethrough; and a measuring circuit having a reference resistor circuit forming, with said first and second temperature dependent resistance wires, a bridge, said measuring circuit being disposed to apply a voltage to said bridge and said electric heater resistance wire and measure the flow rate of said gas.

2. An apparatus according to claim 1, wherein each of said first and second supports is formed with a plurality of openings therethrough.

3. A gas flow measuring apparatus comprising:

a flow measuring tube disposed such that a gas to be measured flows therethrough;

a resistance wire forming an electric heater and wound on a first support made from an electrical insulating material;

a first temperature dependent resistance wire wound on said first support alternately and closely with said electric heater resistance wire so as not to establish a short-circuit therebetween;

a second temperature dependent resistance wire positioned in said flow measuring tube so as to be not easily subjected to the effect of heat generated by said electric heater, said second temperature dependent resistance wire being wound on a second support made from an electrical insulating material;

a measuring circuit having a reference resistor circuit forming, with said first and second temperature dependent resistance wires, a bridge, said measuring circuit being disposed to apply a voltage to said bridge and said electric heater resistance wire and measure the flow rate of said gas, said measuring circuit further having a heat output control circuit including said reference resistor circuit including a pair of resistors forming a voltage divider, a first differential amplifier for differentially amplifying a voltage divider output of said reference resistor circuit and an output of another voltage divider including a series connection of said temperature dependent resistance wires, a second differential amplifier for differentially amplifying a difference between a predetermined reference voltage and an output of said first differential amplifier, and a power amplifier for power amplifying an output of said second differential amplifier to generate a voltage corresponding to the voltage thereof and apply the same to said reference resistors voltage divider and said another voltage divider, and also apply to said electric heater resistance wire through an output resistor, whereby generating a terminal voltage of said output resistor as an output voltage of said heat output control circuit; and a linearizing circuit for cubing the output voltage of said heat output control circuit to generate an output having a linear relationship with the flow rate of said gas, said linearizing circuit including an amplifier for amplifying the output of said heat output control circuit, a first multiplier having two input terminals whereby the output of said amplifier is applied to each of said input terminals and subjected to multiplication to generate a signal indicative of the square of said amplifier output, and a second multiplier having two input terminals one of which is supplied with the output of said first multiplier and the other of which is supplied with said amplifier output to subject the same to multiplication and thereby to generate a signal indicative of the cube of said amplifier output.

4. A gas flow measuring apparatus comprising:

a flow measuring tube disposed such that a gas to be measured flows therethrough;

a resistance wire forming an electric heater and wound on a first support made from an electrical insulating material;

a first temperature dependent resistance wire wound on said first support alternately and closely with said electric heater resistance wire so as not to establish a short-circuit therebetween;

a second temperature dependent resistance wire positioned in said flow measuring tube so as to be not easily subjected to the effect of heat generated by said electric heater, said second temperature dependent resistance wire being wound on a second support made from an electrical insulating material; and a measuring circuit having a reference resistor circuit forming, with said first and second temperature dependent resistance wires, a bridge, said measuring circuit being disposed to apply a voltage to said bridge and said electric heater resistance wire and measure the flow rate of said gas;

and wherein each of said first and second supports is formed with a plurality of projections such that each of said electric heater resistance wire and said first temperature dependent resistance wire wound on said first support and said second temperature dependent resistance wire wound on said second support contacts only in part with the associated one of said supports.

5. An apparatus according to claim 4, wherein each of said first and second supports has a cross-shaped cross-section.

6. An apparatus according to claim 4, wherein each of the projections of said first and second supports has an acute-angled pointed end.

7. An apparatus according to claim 4, wherein each of said first and second supports has substantially a triangular-shaped cross-section.

* * * * *